(12) United States Patent
Johnson (10) Patent No.: US 11,679,343 B2
(45) Date of Patent: *Jun. 20, 2023

(54) INCLINED LINEAR MULTI-PHASE GRAVITY SEPARATION SYSTEM

(71) Applicant: EnXL LLC, Midland, TX (US)

(72) Inventor: Bruce D. Johnson, Midland, TX (US)

(73) Assignee: ENXL LLC, Midland, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/528,400

(22) Filed: Nov. 17, 2021

(65) Prior Publication Data

US 2022/0072449 A1 Mar. 10, 2022

Related U.S. Application Data

(63) Continuation of application No. 17/065,986, filed on Oct. 8, 2020, now Pat. No. 11,285,405.

(60) Provisional application No. 62/912,309, filed on Oct. 8, 2019.

(51) Int. Cl.
| | |
|---|---|
| *B01D 17/028* | (2006.01) |
| *B01D 17/02* | (2006.01) |
| *C02F 1/40* | (2023.01) |
| *E21B 43/34* | (2006.01) |
| *C02F 101/32* | (2006.01) |
| *C02F 103/10* | (2006.01) |

(52) U.S. Cl.
CPC ...... *B01D 17/0214* (2013.01); *B01D 17/0211* (2013.01); *B01D 17/0217* (2013.01); *C02F 1/40* (2013.01); *C02F 2101/32* (2013.01); *C02F 2103/10* (2013.01); *E21B 43/34* (2013.01)

(58) Field of Classification Search
CPC ............ B01D 17/0211; B01D 17/0214; B01D 19/0042; C02F 1/40; E21B 43/34
USPC .......... 210/519, 521, 539, 540; 96/182, 183, 96/184; 166/75.12
See application file for complete search history.

(56) References Cited

U.S. PATENT DOCUMENTS

| | | | | |
|---|---|---|---|---|
| 1,494,670 | A * | 5/1924 | Delaney | E21B 43/34 210/538 |
| 2,236,332 | A * | 3/1941 | Combs | E21B 43/34 210/114 |
| 2,422,555 | A * | 6/1947 | Karlson | B01D 17/0208 210/519 |
| 2,610,697 | A | 9/1952 | Lovelady et al. | |
| 2,613,811 | A * | 10/1952 | Archibald | B01D 17/0211 210/521 |

(Continued)

*Primary Examiner* — Christopher Upton
(74) *Attorney, Agent, or Firm* — Polsinelli PC (57) ABSTRACT

A separation system for separating components of a flow of multi-phase fluid includes an elongate separator vessel oriented on an incline to define a lower inlet end having an inlet for receiving the fluid flow, a raised outlet end, and an inclined top inner surface extending from the inlet end to the outlet end. The system includes a lower weir plate positioned above the inlet end and an upper weir plate positioned below the outlet end having an upper edge defining a liquid level within the separator vessel, thereby allowing a lighter fluid component to flow over the upper edge into a upper section located forwardly of the upper weir plate. The system also includes a clear water pipe with a withdrawal opening positioned below the upper weir plate. The incline of the separator vessel is adjustable in accordance with the composition of the multi-phase fluid.

20 Claims, 9 Drawing Sheets

(56) References Cited

U.S. PATENT DOCUMENTS

| | | | |
|---|---|---|---|
| 2,911,059 A | 11/1959 | Spann | |
| 3,212,232 A | 10/1965 | McMinn | |
| 3,304,697 A | 2/1967 | Ramsey | |
| 3,722,184 A | 3/1973 | McMinn | |
| 4,059,517 A * | 11/1977 | Strahorn | B01D 17/0208 96/184 |
| 4,070,168 A | 1/1978 | BeaLlie | |
| 4,115,279 A * | 9/1978 | Toft | B01D 17/0211 210/521 |
| 4,132,651 A | 1/1979 | deJong | |
| 4,187,089 A | 2/1980 | Hodgson | |
| 4,435,196 A | 3/1984 | Pielkenrood | |
| 4,539,023 A | 9/1985 | Boley | |
| 4,617,031 A | 10/1986 | Suh et al. | |
| 4,622,048 A | 11/1986 | Roberts et al. | |
| 4,778,494 A | 10/1988 | Patterson | |
| 5,064,448 A * | 11/1991 | Choi | B01D 19/0057 96/184 |
| 5,080,792 A | 1/1992 | McGovern et al. | |
| 5,326,474 A | 7/1994 | Adams et al. | |
| 5,415,776 A * | 5/1995 | Homan | B01D 17/0208 210/519 |
| 5,837,152 A * | 11/1998 | Komistek | B01D 17/0211 210/801 |
| 6,099,742 A * | 8/2000 | Komistek | B01D 17/0214 210/540 |
| 6,214,092 B1 | 4/2001 | Odom et al. | |
| 6,533,929 B2 * | 3/2003 | Binsfeld | B01D 17/0211 210/540 |
| 6,537,458 B1 * | 3/2003 | Polderman | B01D 19/0042 96/184 |
| 6,576,029 B2 | 6/2003 | West | |
| 6,709,500 B1 * | 3/2004 | West | B01D 17/0211 96/216 |
| 6,719,048 B1 | 4/2004 | Ramos et al. | |
| 7,014,757 B2 | 3/2006 | Rhodes | |
| 7,033,496 B2 | 4/2006 | Thacker et al. | |
| 7,364,661 B2 | 4/2008 | Puik | |
| 7,429,332 B2 | 9/2008 | Surjaatmadja et al. | |
| 7,488,361 B2 | 2/2009 | Larnholm | |
| 7,942,162 B2 | 5/2011 | Torres | |
| 8,308,959 B2 * | 11/2012 | Noles, Jr. | B01D 21/0045 96/182 |
| 8,627,848 B2 | 1/2014 | Bambara | |
| 9,643,105 B1 | 5/2017 | Walker et al. | |
| 9,724,623 B2 | 8/2017 | Skovholt | |
| 9,789,429 B2 | 10/2017 | Schook | |
| 9,795,898 B2 | 10/2017 | Ernst et al. | |
| 9,833,727 B1 | 12/2017 | Ball, IV | |
| 9,873,067 B1 | 1/2018 | Ball, IV | |
| 9,938,812 B2 * | 4/2018 | Hemstock | B01D 19/0042 |
| 11,007,458 B2 | 5/2021 | Johnson | |
| 11,065,559 B2 * | 7/2021 | Johnson | C02F 1/40 |
| 11,285,405 B2 * | 3/2022 | Johnson | B01D 17/0211 |
| 2002/0153326 A1 | 10/2002 | Oddie | |
| 2002/0162806 A1 * | 11/2002 | Komistek | B01D 17/0211 210/519 |
| 2010/0269696 A1 | 10/2010 | Sarshar et al. | |
| 2011/0247500 A1 | 10/2011 | Akhras et al. | |
| 2016/0008741 A1 | 1/2016 | Beg et al. | |

* cited by examiner

FIG. 15

INCLINED LINEAR MULTI-PHASE GRAVITY SEPARATION SYSTEM

CROSS-REFERENCE TO RELATED APPLICATIONS

This application is a continuation of U.S. application Ser. No. 17/065,986 filed Oct. 8, 2020, which application claims the benefit of U.S. Provisional Patent Application No. 62/912,309, filed Oct. 8, 2019, each of which is incorporated by reference in its entirety herein, and for all purposes.

FIELD OF THE INVENTION

The present invention generally relates to multi-phase fluid gravity separation systems, and more specifically to all-gravity oily water clarification systems used in water processing facilities that receive oil-contaminated water from hydrocarbon-producing wells.

SUMMARY

Briefly described, one embodiment of the present disclosure comprises a multi-phase fluid gravity separation system, such as an oily water clarification system, for separating the various components of a flow of multi-phase fluid. The separation system generally includes a linear or elongate separator vessel oriented on an incline to define a lower inlet end having an inlet for receiving the fluid flow, a raised outlet end, and an inclined top inner surface of the vessel extending from the inlet end to the outlet end. The separation system also includes a lower weir plate positioned above the inlet end to define a lower inlet section, and an upper weir plate positioned below the outlet end to define an upper outlet section. The upper weir plate has an upper edge that also defines the liquid level within the separator vessel, and which allows a lighter liquid component, such as skim oil, to flow over the upper edge into the upper outlet section located forwardly of the upper weir plate. The separation system further includes a clear water pipe with a withdrawal opening positioned below the upper weir plate in an intermediate layer of clear water. In one aspect, the incline of the separator vessel is adjustable in accordance with the composition of the multi-phase fluid, generally between about 10 degrees to about 45 degrees. In another aspect, the separation system includes a cyclonic inlet separator at the lower inlet that is operable to provide an initial dynamic centrifugal separation of the multi-phase fluid upon entry into the separator vessel.

The present disclosure will be better understood upon review of the detailed description set forth below taken in conjunction with the accompanying drawing figures, which are briefly described as follows.

Those skilled in the art will appreciate and understand that, according to common practice, various features and elements of the drawings described above are not necessarily drawn to scale, and that the dimensions and relative positions between the features or elements may be expanded, reduced or otherwise altered to more clearly illustrate the various embodiments of the present disclosure depicted therein

DETAILED DESCRIPTION

The following description, in conjunction with the accompanying drawings, is provided as an enabling teaching of exemplary embodiments of an all-gravity water clarification or separation system that is useful in salt water disposal (SWD) facilities or other water processing facilities that receive contaminated water from one or more hydrocarbon-producing wells. The disclosure further includes one or more methods for separating and/or clarifying the components of a flow of mixed or multi-phase fluids that generally includes water as a primary component. As described below, the system and methods can provide several significant advantages and benefits over other systems and methods for separating or clarifying the components of a multi-phase fluid currently available in the art. However, the recited advantages are not meant to be limiting in any way, as one skilled in the art will appreciate that other advantages may also be realized upon practicing the present disclosure. It will be appreciated, moreover, that other applications for the disclosed separation system, in addition to the clarification of produced oily water from hydrocarbon production wells, are also possible and considered to fall within the scope of the present disclosure.

Furthermore, those skilled in the relevant art will recognize that changes can be made to the described embodiments while still obtaining the beneficial results. It will also be apparent that some of the advantages and benefits of the described embodiments can be obtained by selecting some of the features of the embodiments without utilizing other features, and that features from one embodiment may be combined with features from other embodiments in any appropriate combination. For example, any individual or collective features of method embodiments may be applied to apparatus, product or system embodiments, and vice versa. Accordingly, those who work in the art will recognize that many modifications and adaptations to the embodiments described are possible and may even be desirable in certain circumstances, and are a part of the disclosure. Thus, the present disclosure is provided as an illustration of the principles of the embodiments and not in limitation thereof, since the scope of the invention is to be defined by the claims.

Referring now in more detail to the drawing figures, wherein like parts are identified with like reference numerals throughout the several views, FIGS. 1-14 illustrate one embodiment of the all-gravity water clarification or separation system 10 (also known as a multi-phase fluid gravity separation system) of the present disclosure. With initial reference to FIGS. 1-4, the separation system 10 generally includes an elongate or linear separator vessel 20 that is inclined at an angle 24 relative to horizontal or ground surface 25. As shown in the drawings, the elongate separator vessel 20 can comprise a cylindrical tubular body 22 with a circular cross-section, and can further include a rounded inlet end cap 32 and a rounded outlet end cap 82, which in one aspect can be partially hemispherical. It will be understood, however, that other shapes (including but not limited to oblong, square, or other non-circular cross-sectional shapes and end caps), inclinations (from 0 to 85 degrees), and configurations for the separator vessel are also possible and considered to fall within the scope of the present disclosure.

An inlet flow 6 of mixed or multi-phase fluid (including but not limited to produced oily water) can be introduced into the separator vessel 20 at the lower inlet end 30, such as through an inlet flange/pipe 34 extending through the inlet end cap 32, and from there directed to gradually flow upward and forward toward the raised outlet end 80, at low speed and with a maximum retention time, so as to encourage a natural gravity-based separation of the components of the multi-phase fluid. In the salt water disposal (SWD) application referenced above, for example, the inlet flow 6 of produced oily water into the separation system 10 generally includes gases and vapors, oil, water, and particulate matter (such as sand), and can further include additional impurities or contaminants such sludge, dirt, semisolid paraffins, and the like.

As shown in the drawings, the inlet flow 6 may be introduced into a nearly-full separator vessel 20 through an optional inlet separate or cyclonic inlet diverter 90 that is completely submerged at the lower section 38 of the separator vessel 20. The cyclonic inlet diverter 90 can be configured so as to provide an initial centrifugal separation of the various components, and in one aspect may be adapted or configured for the specific composition of the mixed fluid being introduced into the separation system 10.

One embodiment of the optional cyclonic inlet diverter 90 is shown in further detail in FIGS. 5-8, and generally comprises a much smaller enclosed elongate vessel or tubular body 92 defining a diverter longitudinal axis 91, and having opposed outlet ends 95, a tubular sidewall 94 extending between the opposed outlet ends 95, and a mid-line inlet port 96 located midway between the outlet ends. The diverter longitudinal axis 91 is generally oriented substantially parallel with the separator vessel's inclined centerline plane, and substantially perpendicular to the separator vessel's vertical centerline plane. The diverter 90 can include a single inlet port 96 that is horizontally located (i.e. along the diverter longitudinal or centerline axis) midway between the opposed outlet ends, and that can be vertically located in an offset position to the longitudinal axis (i.e. above or below a diverter horizontal centerline plane) so the inlet flow enters directly into the upper or lower half or hemisphere of the elongate vessel. Thus, in one aspect the fluid flow through the inlet port 96 can be substantially tangential to an upper or lower portion, respectively, of the tubular sidewall 94 of the elongate vessel 92.

Internal components, such as a splitter plate (not shown), can then split the inlet fluid flow into a first sub-stream and a second sub-stream, with each sub-stream flowing outward through the tubular body 92 toward an outlet end 95. With the inlet port 96 located above the diverter horizontal centerline plane, the splitter plate and round tubular sidewall 94 of the elongate vessel 92 can naturally initiate the cyclonic motion of the fluid as it flows around and downwardly across the far portion of the tubular sidewall 94, following the circular contour of the inner sidewall surfaces. Additional internal components, such as swirl plates (also not shown), can be positioned on each side of the splitter plate, and can have angled surfaces configured to increase the cyclonic motion in the first and second sub-streams within the diverter vessel. Through dynamic centrifugal action/separation, the cyclonic flows can quickly push the heavier constituents (solids and water) further outward toward the interior rounded surfaces of the tubular sidewall 94 than the lighter constituents (gas and oil).

The cyclonic inlet diverter 90 shown in FIGS. 5-8 can further include multiple outlet ports on each end of the cyclonic inlet diverter, with a separate outlet port for a majority portion of each constituent of the mixed fluid on each side. For instance, an aperture 97 formed through each opposing end wall 95 of the elongate vessel and centered about the diverter longitudinal axis 91 can serve as a gas outlet end port, while an enlarged radial aperture 98 formed through the lateral sidewall portion of the diverter vessel adjacent to each opposing end wall can serve as a water/particulate matter outlet port. Likewise, one or more additional but smaller radial apertures 99 formed through the lateral sidewall portions of the diverter vessel between each enlarged radial aperture 98 and the midline inlet port 96 can serve as oil outlet ports.

Figure 1:
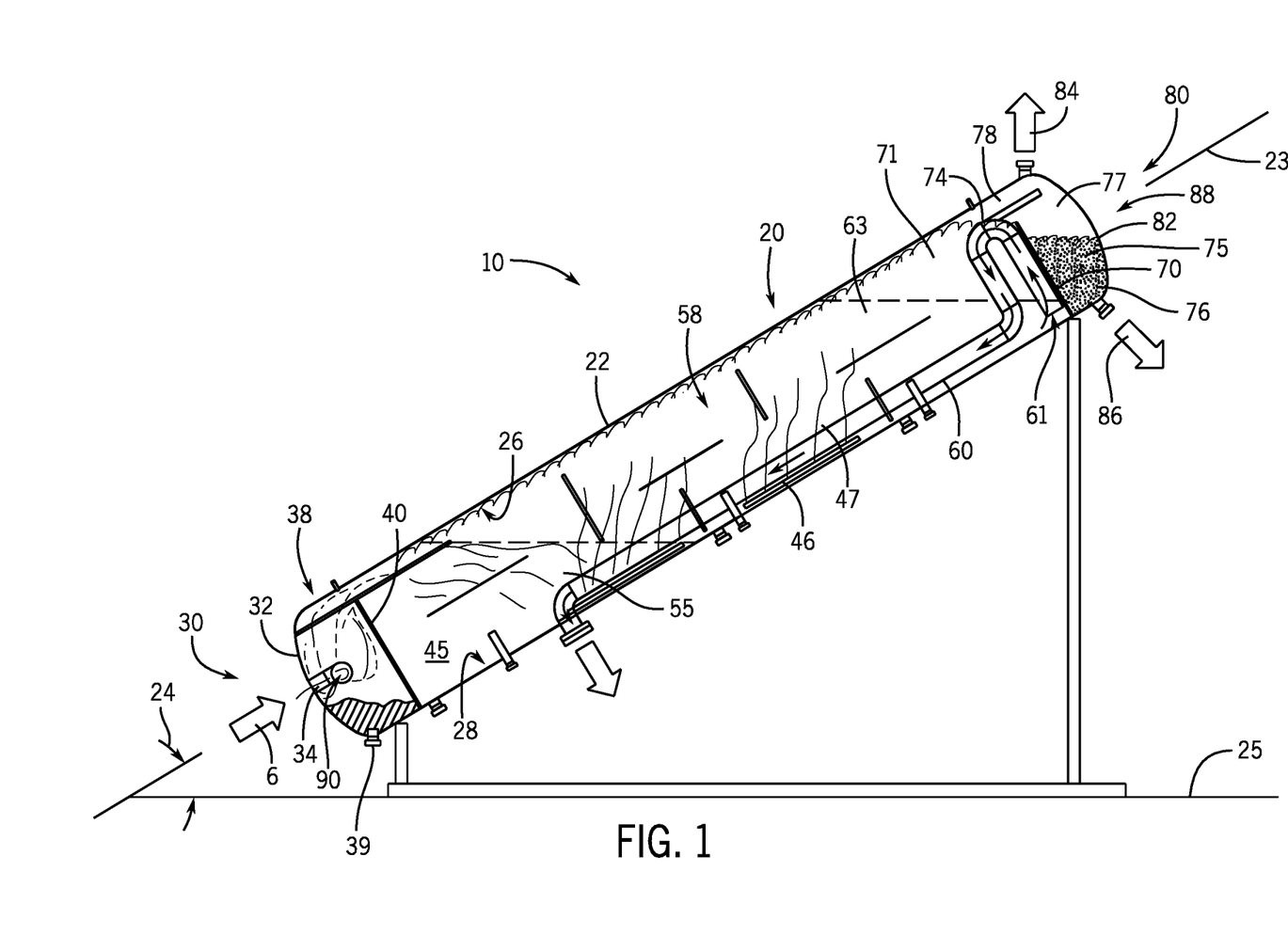
FIG. 1 is a schematic side view of an inclined linear multi-phase fluid gravity separation system, in accordance with a representative embodiment of the present disclosure.
Figure 2:
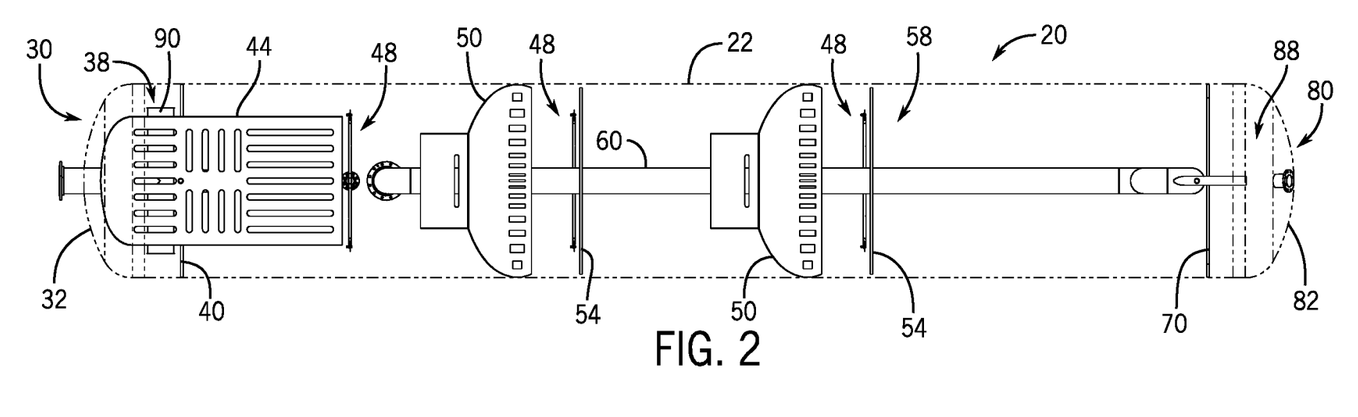
FIG. 2 is a cut-away top view of the separation system of FIG. 1.
Figure 3:
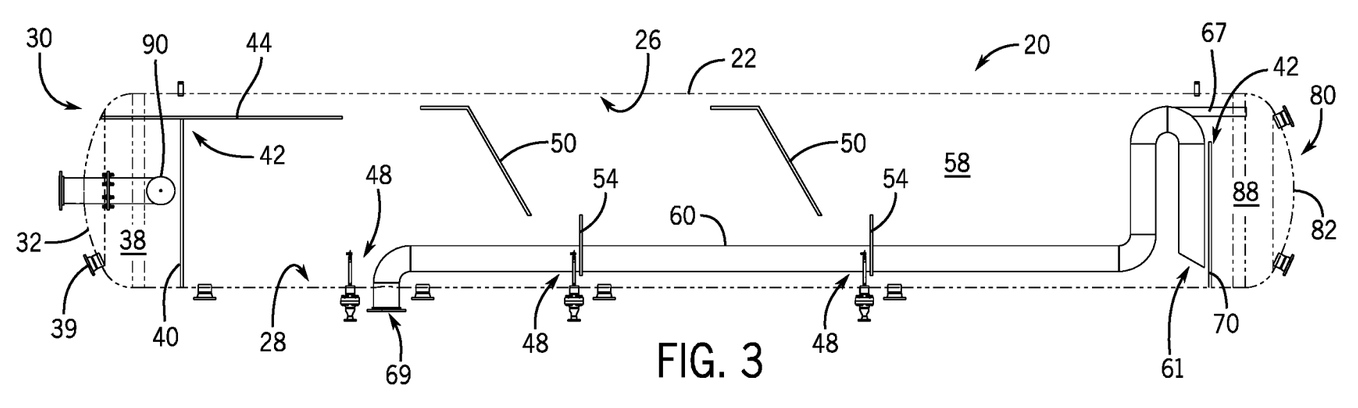
FIG. 3 is a cut-away side view of the separation system of FIG. 1.
Figure 4:
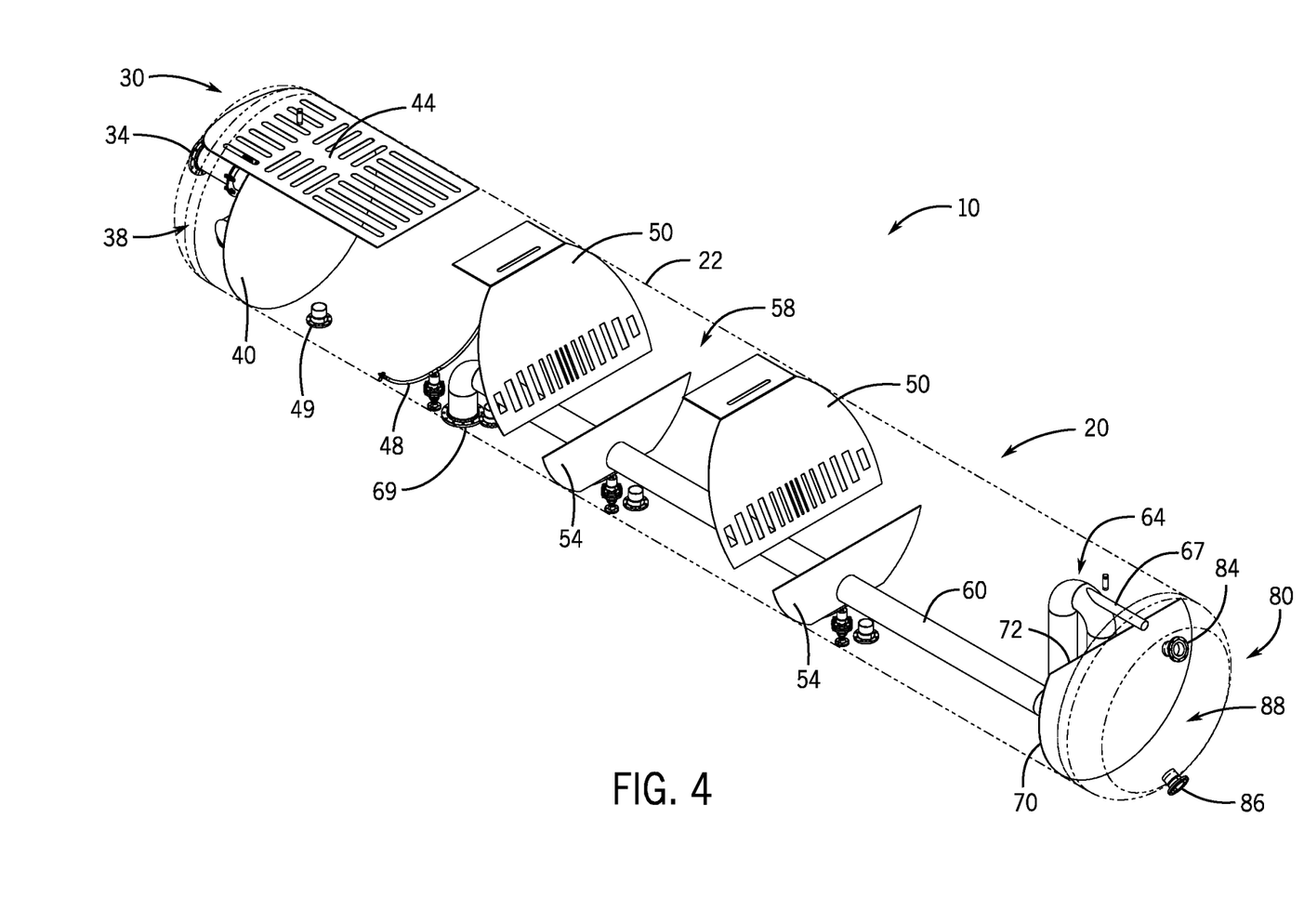
FIG. 4 is a cut-away perspective view of the separation system of FIG. 1.
Figure 5:
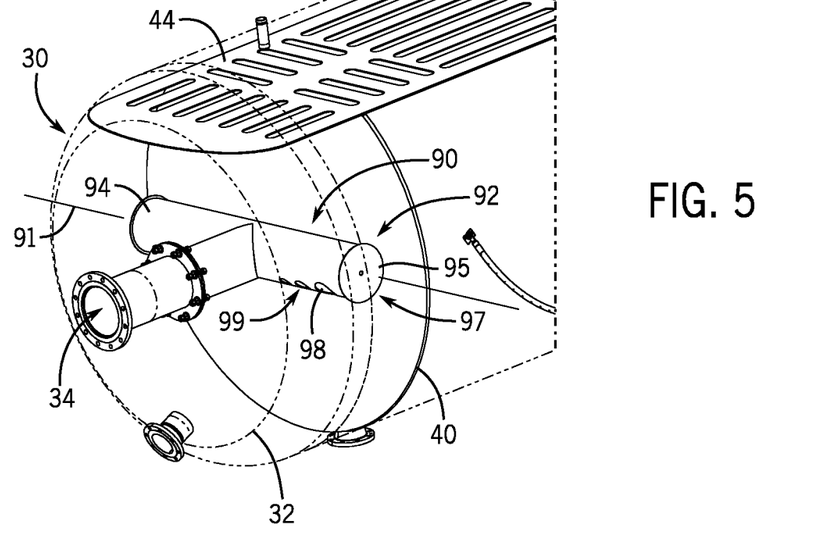
FIG. 5 is a close-up cut-away top perspective view of the lower inlet end of the separation system of FIG. 1.
Figure 6:
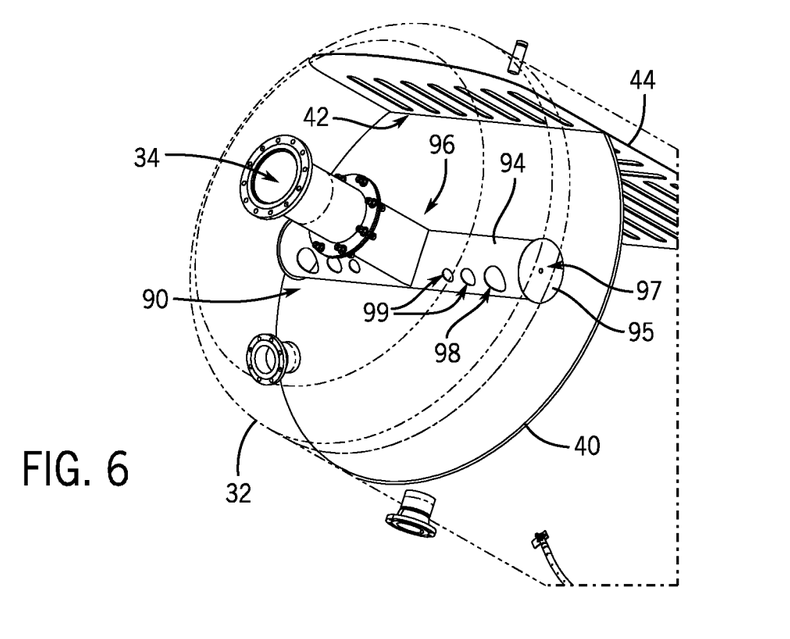
FIG. 6 is a close-up cut-away bottom perspective view of the lower inlet end of the separation system of FIG. 1.
Figure 7:
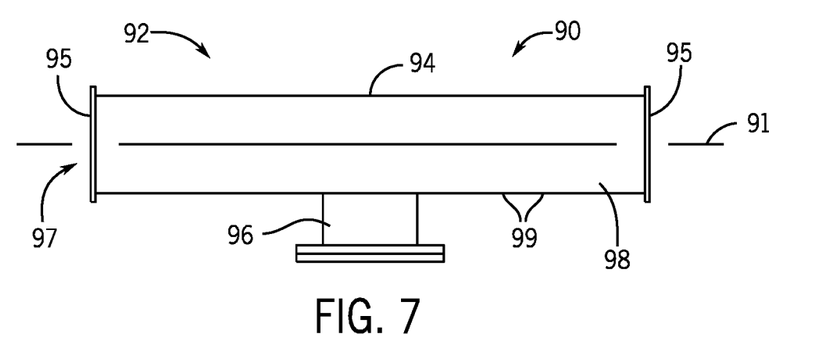
FIG. 7 is a top view of a representative cyclonic inlet separator located within the lower inlet end of the separation system of FIG. 1.
Figure 8:
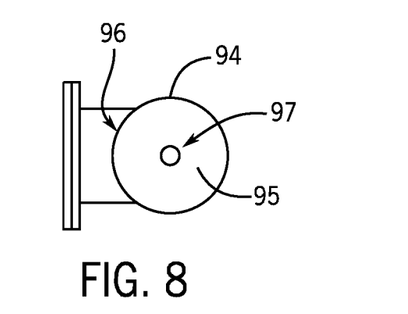
FIG. 8 is a side view of the representative cyclonic inlet separator of FIG. 7.

Additional details and disclosure regarding the structure, positioning, and operation of the cyclonic inlet diverter within a substantially-horizontal water clarification system, including the internal components such as the splitter and swirl plates, can be found in U.S. Pat. No. 11,065,559, which is incorporated by reference in its entirety herein and for all purposes. It will nevertheless be appreciated that the cyclonic inlet diverter used in the inclined separation system 10 of the present disclosure, such as that shown in FIGS. 5-8, can differ from the cyclonic inlet diverters of U.S. Pat. No. 11,065,559, especially in that the cyclonic inlet diverter in the instant disclosure can be completely submerged within the mixed fluid at the lower inlet end 30 of the inclined elongate separator vessel 20. Furthermore, as shown in FIG. 5-6, the cyclonic inlet diverter 90 may also be modified so that the radial outlet apertures 98, 99 are located at an angle below the horizontal, so as to direct the outlet flow downward onto a lower portion of the inlet end cap 32.

With reference back to FIGS. 1-4, a first or lower weir plate 40 can be positioned forward and/or above the cyclonic inlet separator 90 to define a lowest, extra-heavy material section 38, with the lower weir plate 40 extending upwards from the bottom inner surface 28 to near a top inner surface 26 of the separator vessel 20. As the mixed fluid flows upwardly over the upper edge 42 of this first weir plate 40, the heaviest particulate matter falls out and settles downward toward the bottom of the lower section 38 for removal through a lowermost bottom drain 39. At the same time the gas and vapor components 77 immediately bubble upward through the mixed liquid toward the inclined top inner surface 26 (which is forwardly and upwardly inclined at a predetermined but adjustable angle), and then travel forward and upward along the top inner surface toward to the raised outlet end 80, where the gases and vapors 77 bubble up through the liquid surface 74 into an enclosed gas head space 78 defined by the outlet end cap 82. A gas/vapor outlet 84 through the uppermost top inner surface of the outlet end cap 82 allows for the gaseous components 77 to exit the separator vessel 20.

The oily water mixture with the remainder of the entrained particulate matter flows slowly upward over the upper edge 42 of the first or lower weir plate 40, and then back downward and forward into an intermediate section 58 of the separator vessel 20. As described in more detail below, for instance, the intermediate section 58 can contain, at its lower end proximate the forward side of the lower weir plate 40, a heavy liquid portion 45 of a layer of as-yet-unseparated oily water 55, above which can form an intermediate layer of clarified or clear water 63 and upper layers of partially oily water 71 and skim oil 75.

As shown in the drawings, a perforated or slotted plate 44 can be secured to the upper edge 42 of the lower weir plate 40 to aid in distributing the flow of the mixed fluid across the width of the separator vessel 20, thereby slowing and calming the liquid components as they move forwardly into the intermediate section 58. In one aspect the perforated or slotted plate 44 can extend rearwardly to the inlet end cap 32 and forwardly into the intermediate section 58 beyond the lower weir plate 40, so that the liquid components of the mixed fluid pass through the slots or perforations both when exiting the lower section 38 and again when entering the intermediate section 58.

The intermediate section 58 can be the longest section of the linear separation system 10, and defines the volume where most of the separation of the fluid components takes place. Throughout the intermediate section 58, for instance, diverter and/or baffle plates can be strategically positioned in the upper and lower halves of the separator vessel, causing the fluid to follow a tortuous vertical path as it slowly flows forwardly and upwardly through the separator vessel toward the "light fluid" portion at its upper end. The longer dwell times and changes in direction can help to separate the oil molecules from the water molecules, with the lighter oil moving vertically upward toward the separator vessel's top inner surface 26.

Figure 9:
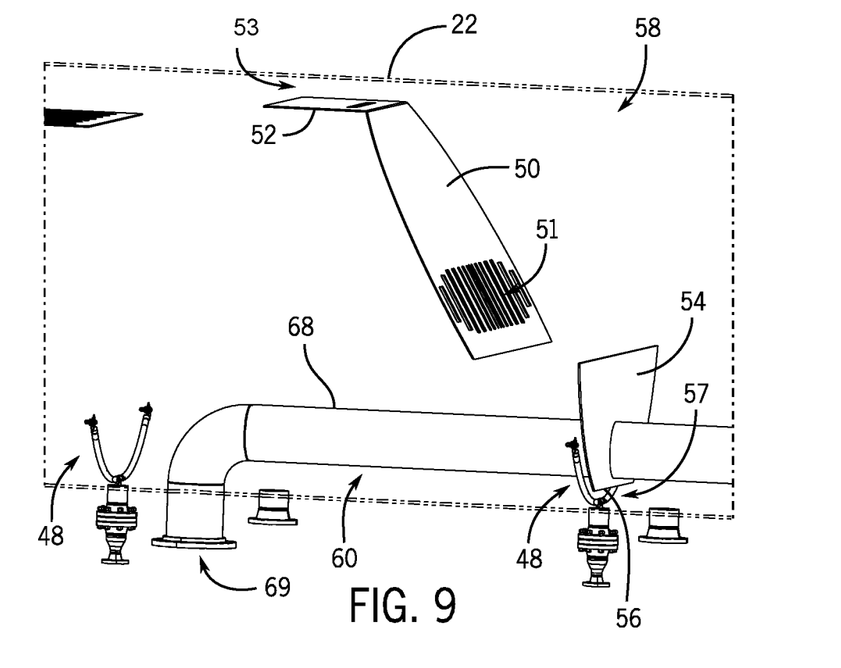
FIG. 9 is a close-up cut-away perspective view of a slotted diverter plate and a solid baffle plate located in the intermediate section of the separation system of FIG. 1.
Figure 10A:
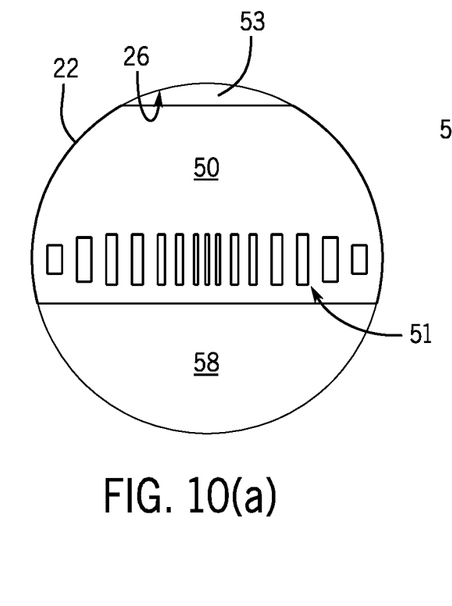
FIGS. 10A and 10B are front and side views, respectfully, of the slotted diverter plate of FIG. 9.
Figure 10B:
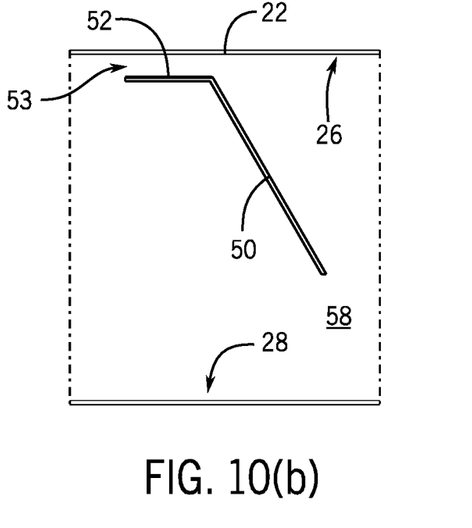
Figure 11:
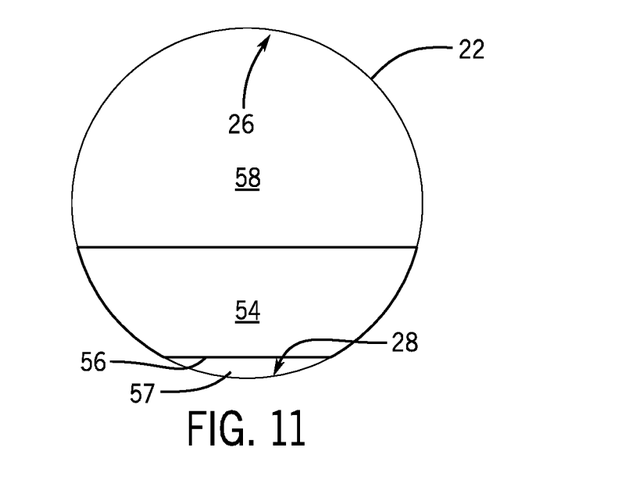
FIG. 11 is a front view of the solid baffle plate of FIG. 9.

For example, and with reference to FIGS. 9-11, in one aspect the tortuous vertical path of the oily water through the intermediate section may be defined by slotted diverter plates 50 positioned within the upper half or hemisphere of the separator vessel and solid baffle plates 54 positioned in axially offset locations within the lower half or hemisphere of the separator vessel. The internal diverter plates 50 and baffle plates 54 can cause a majority portion of the fluid to move alternatively downward and upward as it travels axially toward the raised outlet end 80, while providing gaps 53, 57 between the top edges or planar sheet portions 52 of the diverter plates 50 and the bottom edges 56 of the baffle plates 54 and the inner surfaces 26, 28 of the separator vessel 20, respectively. In particular, the gaps 53 between the top edges or planar sheet portions 52 of the slotted diverter plates 50 and the top inner surface 26 of the separator vessel 20 can allow both the gaseous components and the separated oil to naturally travel upward and forward along the top inner surface toward the raised outlet end 80 of the separator vessel. In contrast, the gaps 57 between the bottom edges 56 of the solid baffle plates 54 and the bottom inner surface 28 of the separator vessel 20 can allow for any residual particulate matter and the heavier fluid components to travel back downward along bottom inner surface 28 toward the heavy fluid portion 45 of the intermediate section adjacent the forward surface of the lower weir plate 40. In addition, the slots 51 in the slotted diverter plates 50 can be sized and spaced from one another to control, spread out, and quiet the flow of the oily water through the intermediate section 58 to better promote the natural gravity-based separation of the fluid components.

As noted above, upon arrival at the top inner surface 26 of the intermediate section 56, the gaps 53 above the top ends 52 of the upper half diverter plates 50 allow both the gaseous components and the separated oil to naturally flow upward and forward along the top inner surface 28 toward the raised outlet end 80 of the separator vessel 20, eventually reaching a upper section 88 that is defined by a second or upper weir plate 70 and the outlet end cap 82. Similar to the lower weir plate, the upper weir plate 70 can extend upward from the bottom inner surface 28 of the separator vessel 20 to an upper edge 72 that is spaced below the top inner surface 28. The upper edge 72 of the upper weir plate 70 can define the overall liquid level 74 in the separator vessel 20, with the gaseous components 77 bubbling up through the liquid surface 74 and into the enclosed gas head space 78 defined by the upper portion of the outlet end cap 82. Moreover, the upper weir plate 70 also serves as a weir that allows the separated or skim oil component 75 of the multi-phase fluid to flow laterally from an upper portion of the intermediate section 58, over the upper weir plate's upper edge 72, and into the oil section or "oil bucket" 76 that is located forwardly of the upper weir plate 70, from whence the oil 75 is withdrawn through the oil outlet 86 through the bottom inner surface or a lower portion of the outlet end cap 82.

Figure 12:
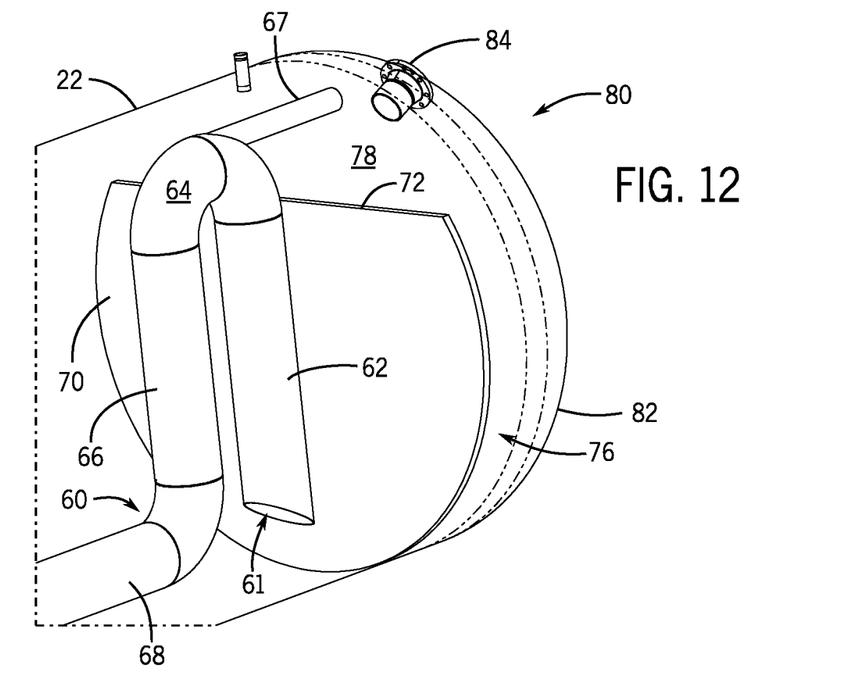
FIG. 12 is a close-up cut-away perspective view of the internal clear water pipe and upper weir plate of the separation system of FIG. 1.
Figure 13:
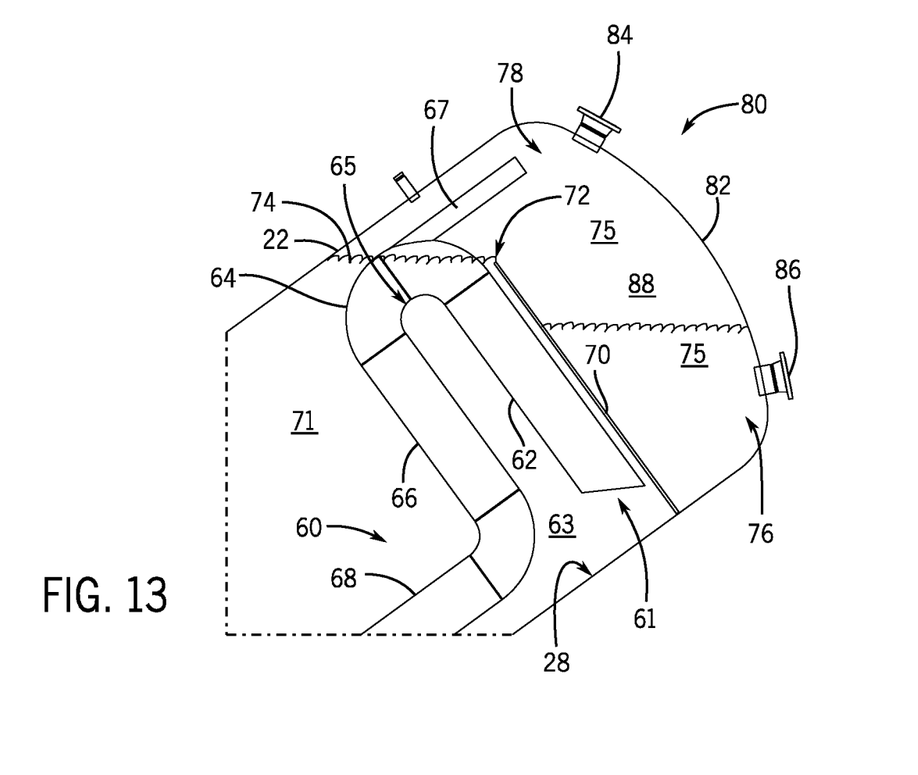
FIG. 13 is a close-up cross section side view of the internal clear water pipe and upper weir plate of FIG. 12.

The separation system 10 further includes an internal clear water pipe 60 having a withdrawal opening 61 that can be located adjacent or proximate to the bottom inner surface 28 of the separator vessel 20 below the upper weir plate 70, where the clarified or clear water component 63 will naturally be the most clean. From the withdrawal opening 61, the internal clear water pipe 60 can extend upwardly and substantially parallel to the upper weir plate 70, toward an upside down or inverted U-shaped elbow 64, also known as a "gooseneck", that reverses the direction of the flow of clear water back downward toward the bottom inner surface 28 of the separator vessel 20. The inverted elbow 64 can have a convex lower surface that serves as a pour-over surface 65 for the clarified water 63, and which can be positioned about or below the elevation of the upper edge 72 of the upper weir plate 70 so as to naturally continuously withdraw liquid from the intermediate layer of clarified or clear water 73. To prevent the formation of a siphoning vacuum within the inverted elbow 64 created by the outflowing water, a short internal pipe 67 can extend through the concave upper surface of the inverted elbow to vent the elbow space to the enclosed gas head space 78 above the surface 74 of the liquid contained within the separator vessel 20.

The portion of the internal clear water pipe 60 extending from the withdrawal opening 61 to the inverted elbow 64 or "gooseneck" may be defined as the rising section 62 of the clear water pipe. Moreover, the rising section 62 can be of sufficient length to vertically separate the withdrawal opening 61 from the pour-over surface 65, thereby reducing or preventing any disturbance or turbulence created by the clear water 63 pouring over the gooseneck interior surface from being transmitted back into the bulk of the liquid within the separator vessel.

From the inverted elbow 64, the internal clear water pipe 60 can direct the flow of clarified water 63 back downward in a first descending section 66 toward the bottom inner surface 28 of the separator vessel 20 and rearwardly in a second descending section 68 toward the lower end of the intermediate section 58, where it can be turned once more to exit the separator vessel 20 through a clear water outlet 69 that can extend through the bottom inner surface. The rearward or second descending section 68 of the internal clear water pipe 60 is illustrated in the drawings as a long section extending downward through the intermediate section 58 of the separator vessel, so as to locate the clear water outlet 69 as a more convenient location closer to grade. Nevertheless, it is foreseen that other configurations for the internal clear water pipe 60, such as a rearward leg of shorter length or a lateral outlet through the side of the separator vessel, are also possible and considered to fall within the scope of the present disclosure.

It is understood that as the oily water mixture flows forwardly and upwardly through the intermediate section 58 of the separator vessel 20 toward the raised outlet end 80, the liquid components will naturally separate or stratify under the influence of gravity into a top layer of skim oil 75 that is adjacent the upper weir plate 70 and the enclosed gas head space 78, an upper layer of partially oily water 71, and an intermediate layer of clarified or clear water 63 having equal to or less than a prescribed threshold amount of entrained oil. The intermediate layer of clarified water 63 remains above an as-yet-unseparated lower layer of oily water 55, which also includes the heavy fluid portion 45 with any entrained particulate matter that is carried over the lower weir plate 40. Given the size of the separator vessel 20 relative to the rate of the inlet flow 6, the different layers can be generally quiescent, with only the bubbling up of the gaseous components 77 and the separated oil 75 breaking through the liquid surface 74 at the raised outlet end 80. In one aspect this can comprise moderate bubbling along the boundary of the liquid surface 74 with the top inner surface 26 of the tubular body 22, together with smaller effervescent-type bubbling across the remainder of the liquid surface 74.

In one representative embodiment, the dimensions of the separator vessel 20 and its internal components (including but not limited to the length and cross-sectional diameter of the tubular body 22, the height of the upper weir plate 70 relative to the height/diameter of the tubular body 22, and the internal diameter and height of the rising section 62 of the clear water pipe 60 relative to the height of the upper edge 72 of the upper weir plate 70) may be configured so that the upper layer of partially oily water 71 immediately below the top layer of skim oil 75 does not extend downwardly below the upper weir plate 70 for most anticipated flows of mixed fluid. This aspect of the separation system 10 can ensure that the withdrawal opening 61 for the internal clear water pipe 60 remains in the intermediate layer of clarified or clear water 63 and spaced below the upper layers of partially oily water 71 and skim oil 75.

Figure 14:
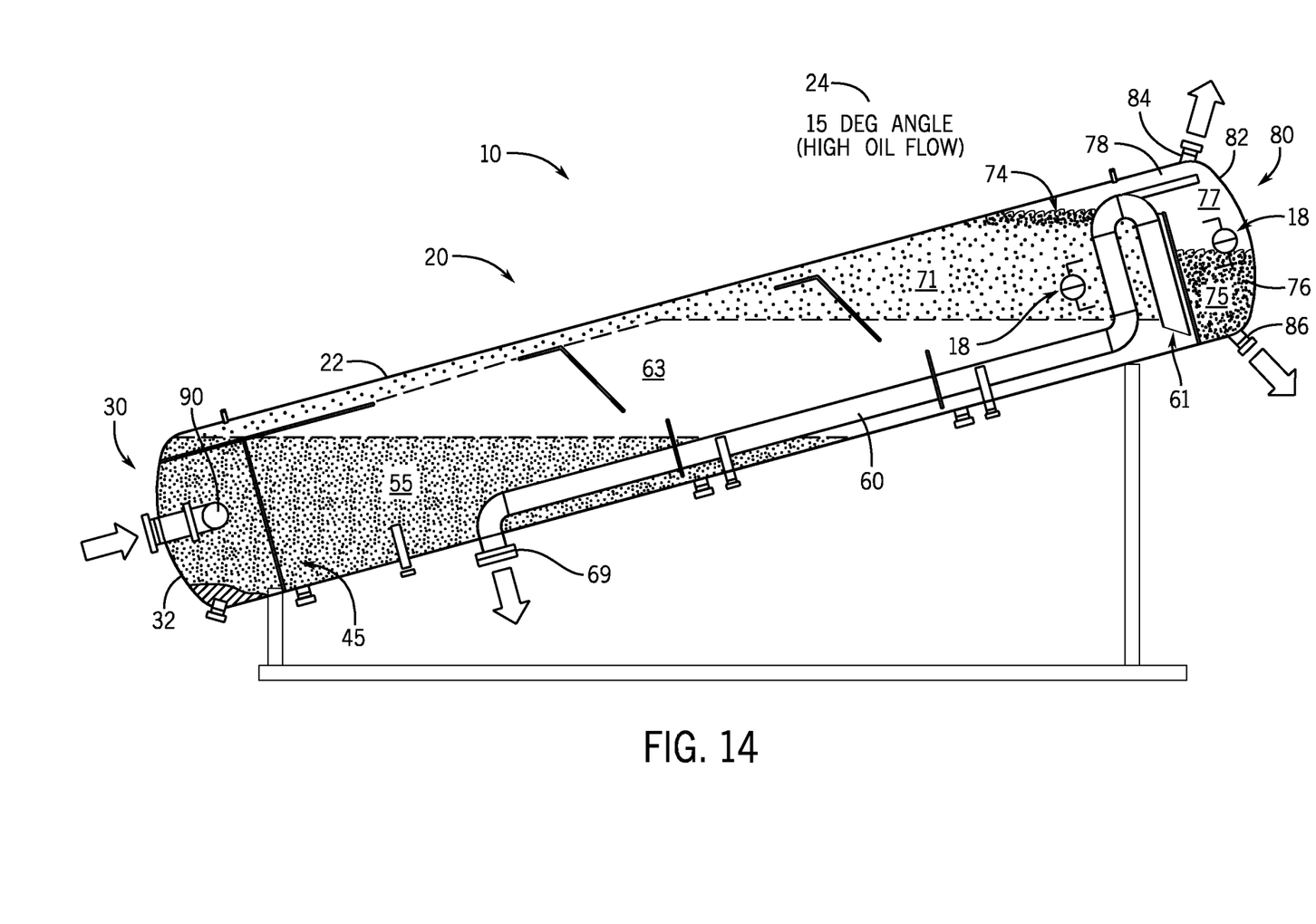
FIG. 14 is a schematic side view of the inclined linear multi-phase fluid gravity separation system, in accordance with another representative embodiment of the present disclosure.
Figure 15:
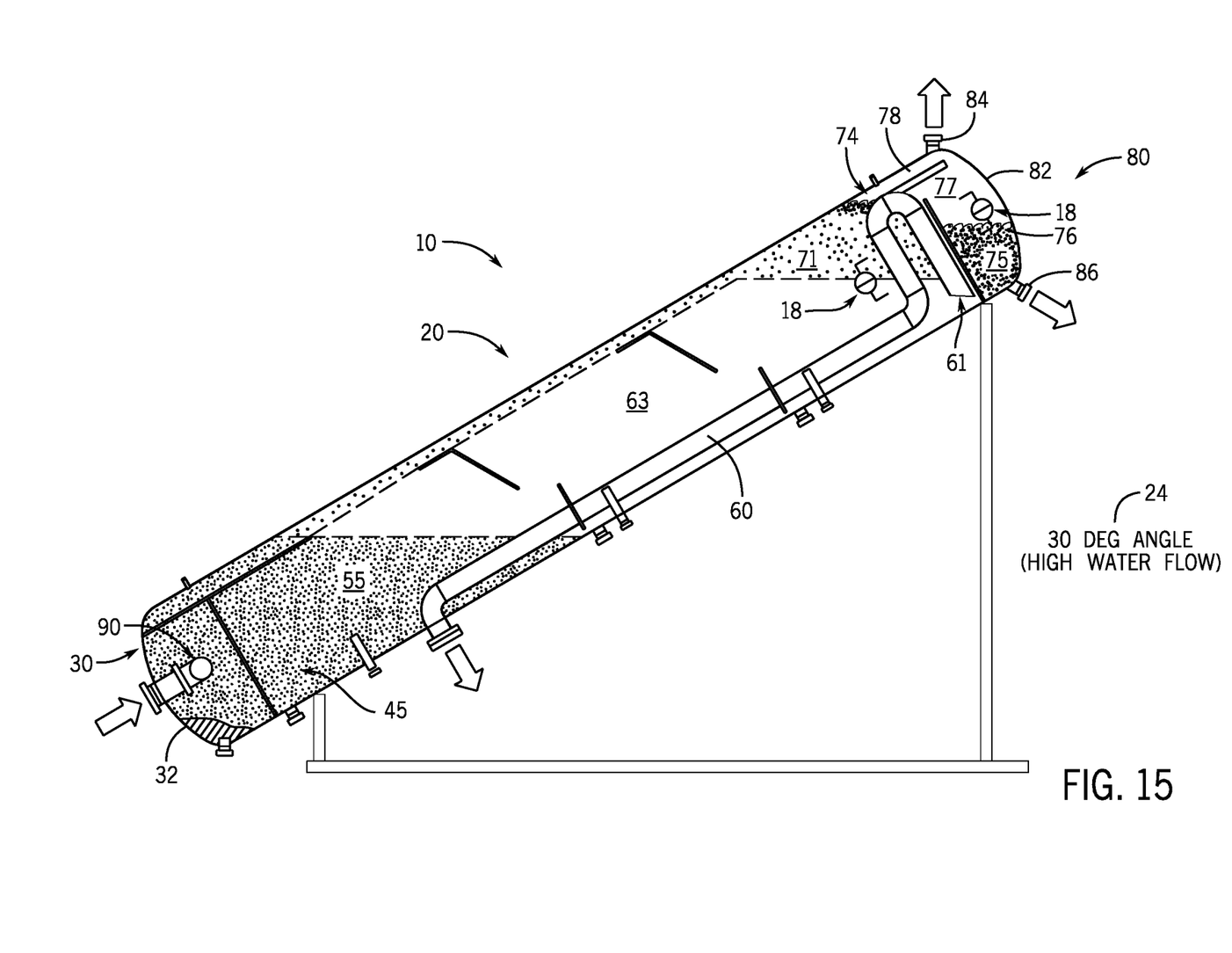
FIG. 15 is a schematic side view of the inclined linear multi-phase fluid gravity separation system, in accordance with yet another representative embodiment of the present disclosure.

Furthermore, and with reference to FIGS. 14 and 15, the inclination angle 24 of the separation system 10 can also be modified at the operation site to further configure or customize the system to a particular composition of multi-phase fluids. For example, adjusting the inclination 24 of the separator vessel 20 downward to a smaller angle, as shown in FIG. 14, effectively increases the volume of the separated oil layers 71, 75 relative to the volume of the separated clear water layer 63, so as to accommodate a higher percentage of oil within the flow of mixed fluid (in the quiescent steady-state or equilibrium condition) without the oily water layer 71 downwardly encroaching on the withdrawal opening 61 located in the clear water layer 63. In contrast, adjusting the inclination 24 of the separator vessel 20 upward to a greater angle, as shown in FIG. 15, effectively reduces the volume of the separated oil layer 71, 75 relative to the volume of the separated clear water layer 63 in the quiescent steady-state or equilibrium condition, thereby accommodating a higher percentage of water within the flow of mixed fluid, while still forming an upper layer of partially oily water 71 having sufficient thickness (or dwell time) to provide for the improved separation of the skim oil layer 75 from the clear water layer 63.

If desired, sight glasses 18 or similar monitoring systems can be located on or within the separator vessel 20 and straddling the anticipated boundary lines between the separated layers, so as to provide visual or electronic confirmation of the extent or thickness of the various separated fluid layers during operation, and thereby confirm a proper or effective inclination of the vessel.

In some embodiments the separation system 10 can further include a 'nano-bubble' or 'micro-bubble' gas injection system 46 (see FIG. 1), in which a series of perforated tubes or similar structures can be positioned adjacent the bottom inner surface 28 of the separator vessel 20 in the intermediate section 58, within the lower portion 45 of the as-yet-unseparated lower layer of oily water 55, or also within the lowest, extra-heavy material section 38 below the lower weir plate 40. The gas injection system 46 can be configured to produce numerous streams of very small gas bubbles that travel vertically upward through the liquid column to the top inner surface 26, with the bubbles interacting with and/or capturing entrained oil during their passage to help lift the entrained oil to the top inner surface 26. The upward-flowing curtain 47 of gas bubbles can also serve to better separate or 'scrub' the oil component and solids or other impurities from the water component. In one aspect the injected gas can be natural gas, compressed air, a neutral gas (e.g. nitrogen), or other fluids in a gaseous state.

As indicated above, the separation system has been described herein in terms of one or more preferred embodiments and methodologies considered by the inventor to represent the best mode of carrying out the invention. It will be understood by the skilled artisan, however, that a wide range of additions, deletions, and modifications, both subtle and gross, may be made to the illustrated and exemplary embodiments of the separation system without departing from the spirit and scope of the present disclosure. For example, in one aspect the separation system can further include a magnetic or electrical induction system, as known in the art, for enhancing the separation of the different components of the multi-phase fluid. In other aspects, an internal cleaning system 48 (see FIGS. 2-4, 9) comprising a plurality of injector nozzles can be located on or adjacent the bottom inner surface 28 of the tubular body 22, and configured to directed a pressurized liquid downward onto the bottom inner surface 28, thereby causing any buildup of solids, debris, or sludge to be swept toward collection drains 49. These and other revisions might be made by those of skill in the art without departing from the spirit and scope of the invention that is constrained only by the following claims.

What is claimed is:

1. A separation system for separating the components of a flow of a multi-phase fluid, the separation system comprising:
   an elongate separator vessel having a longitudinal axis oriented on an incline relative to horizontal to define a lower inlet end having an inlet configured to receive the flow of the multi-phase fluid, a raised outlet end, and an inclined top inner surface extending from the inlet end to the outlet end, the separator vessel being configured to separate the liquid components of the multi-phase fluid into a lower mixed portion of as-yet-unseparated oily water and an upper stratified portion defined by a clear water component, a partially oily water component, and a skim oil component;
   a weir plate extending upward from a bottom inner surface of the separator vessel to an upper edge spaced below the top inner surface of the separator vessel within the upper stratified portion, the weir plate configured to define a liquid level in the separator vessel and to allow the skim oil component to flow laterally over the upper edge and into a skim oil section located forwardly or above the weir plate;
   a gas/vapor outlet at a top portion of the skim oil section configured for discharging a gas/vapor component of the multi-phase fluid from the separator vessel;
   an oil outlet at a bottom portion of the skim oil section configured for discharging the skim oil component of the multi-phase fluid from the separator vessel; and
   a clear water pipe having a withdrawal opening located below the weir plate and configured for withdrawing the clear water component of the multi-phase fluid from the separator vessel,
   wherein the separator vessel is configured for continuous flow operation with the incline ranging between about 5 degrees to about 85 degrees.

2. The separation system of claim 1, wherein the incline of the elongate separator vessel is adjustable in accordance with a composition of the multi-phase fluid.

3. The separation system of claim 1,
   wherein the bottom inner surface further comprises an inclined bottom inner surface extending from the inlet end to the outlet end, and
   wherein the withdrawal opening of the clear water pipe is located proximate the bottom inner surface.

4. The separation system of claim 1, wherein the clear water pipe further comprises:
   a rising section extending from the withdrawal opening upward toward the top inner surface to an inverted elbow having a convex lower surface spaced below the upper edge, so as to define a pour-over surface for the clear water component; and
   a descending section extending from the inverted elbow to a clear water outlet within the lower mixed portion of the separator vessel.

5. The separation system of claim 4, wherein the descending section of the clear water pipe further comprises a first descending section aligned substantially parallel to the rising section and a second descending section aligned substantially parallel to and adjacent an inclined bottom inner surface of the separator vessel extending from the inlet end to the outlet end.

6. The separation system of claim 1, further comprising an inlet separator located within the separator vessel proximate to the lower inlet end and in fluid communication with the inlet, the inlet separator being configured to provide an initial separation of the multi-phase fluid upon entry into the separator vessel.

7. The separation system of claim 1, wherein the inlet end and the outlet end of the separator vessel further comprise a rounded inlet end cap and a rounded outlet end cap, respectively.

8. The separation system of claim 7, wherein inlet extends through the rounded inlet end cap.

9. The separation system of claim 7, wherein gas/vapor outlet extends through an upper portion of the rounded outlet end cap.

10. The separation system of claim 7, wherein oil outlet extends through a lower portion of the rounded outlet end cap.

11. The separation system of claim 1, further comprising at least one diverter plate disposed transversely to the longitudinal axis below the weir plate and configured to redirect the liquid components along a tortuous vertical path within the separator vessel.

12. A separation system for separating the components of a flow of a multi-phase fluid, the separation system comprising:
    an elongate separator vessel having a longitudinal axis oriented on an incline relative to horizontal to define a lower inlet end having an inlet configured to receive the flow of the multi-phase fluid, a raised outlet end, and an inclined top inner surface extending from the inlet end to the outlet end, the separator vessel being configured to separate the liquid components of the multi-phase fluid into a lower mixed portion of as-yet-unseparated oily water and an upper stratified portion defined by a clear water component, a partially oily water component, and a skim oil component;
    a weir plate extending upward from a bottom inner surface of the separator vessel to an upper edge spaced below the top inner surface of the separator vessel within the upper stratified portion, the weir plate configured to define a liquid level in the separator vessel and to allow the skim oil component to flow laterally over the upper edge and into a skim oil section located forwardly or above the weir plate:
    a gas/vapor outlet at a top portion of the skim oil section configured for discharging a gas/vapor component of the multi-phase fluid from the separator vessel;
    an oil outlet at a bottom portion of the skim oil section configured for discharging the skim oil component of the multi-phase fluid from the separator vessel; and
    a clear water pipe having a withdrawal opening located below the weir plate and configured for withdrawing the clear water component of the multi-phase fluid from the separator vessel, the clear water pipe including:
      a rising section extending from the withdrawal opening upward toward the top inner surface to an inverted elbow having a convex lower surface spaced below the upper edge so as to define a pour-over surface for the clear water component; and
      a descending section extending from the inverted elbow to a water outlet within the lower mixed portion of the separator vessel.

13. The separation system of claim 12, wherein the separator vessel is configured for continuous flow operation with the incline adjustably ranging between about 5 degrees to about 85 degrees relative to horizontal.

14. The separation system of claim 13, wherein the separator vessel is configured for continuous flow operation with the incline adjustably ranging between about 5 degrees to about 60 degrees relative to horizontal.

15. The separation system of claim 14, wherein the separator vessel is configured for continuous flow operation with the incline adjustably ranging between about 10 degrees to about 45 degrees relative to horizontal.

16. The separation system of claim 12, wherein the incline of the separator vessel is adjustable in accordance with a composition of the multi-phase fluid.

17. The separation system of claim 12,
    wherein the bottom inner surface further comprises an inclined bottom inner surface extending from the inlet end to the outlet end, and
    wherein the withdrawal opening of the clear water pipe is located proximate the bottom inner surface.

18. The separation system of claim 17, wherein the descending section of the clear water pipe further comprises a first descending section aligned substantially parallel to the rising section and a second descending section aligned substantially parallel to and adjacent the inclined bottom inner surface of the separator vessel.

19. The separation system of claim 12, further comprising a cyclonic inlet separator located within the separator vessel proximate to the lower inlet end and in fluid communication with the inlet, the cyclonic inlet separator being configured to provide an initial dynamic centrifugal separation of the multi-phase fluid upon entry into the separator vessel.

20. The separation system of claim 12, further comprising at least one diverter plate disposed transversely to a longitudinal axis below the weir plate and configured to redirect the fluid along a tortuous vertical path within the separator vessel.

\* \* \* \* \*